United States Patent
Du et al.

(10) Patent No.: US 11,537,003 B2
(45) Date of Patent: Dec. 27, 2022

(54) BACKLIGHT MODULE AND DISPLAY DEVICE

(71) Applicants: K-Tronics (Suzhou) Technology Co., Ltd., Jiangsu (CN); BOE Technology Group Co., Ltd., Beijing (CN)

(72) Inventors: Yufei Du, Beijing (CN); Yurong Cao, Beijing (CN); Chuanwei Zhang, Beijing (CN); Zhi Yin, Beijing (CN)

(73) Assignees: K-Tronics (Suzhou) Technology Co., Ltd., Suzhou (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/480,065

(22) Filed: Sep. 20, 2021

(65) Prior Publication Data
US 2022/0155637 A1 May 19, 2022

(30) Foreign Application Priority Data
Nov. 16, 2020 (CN) .......................... 202011277901.7

(51) Int. Cl.
G02F 1/13357 (2006.01)
F21V 8/00 (2006.01)

(52) U.S. Cl.
CPC ..... G02F 1/133605 (2013.01); G02B 6/0055 (2013.01); G02F 1/133603 (2013.01)

(58) Field of Classification Search
CPC ............. G02B 6/0055; G02F 1/133605; G02F 1/133609; G02F 1/133603
See application file for complete search history.

(56) References Cited

FOREIGN PATENT DOCUMENTS

| CN | 102313209 A | * | 1/2012 | ........... G02B 6/0001 |
| CN | 103244865 A | * | 8/2013 | |

* cited by examiner

Primary Examiner — Karabi Guharay
(74) Attorney, Agent, or Firm — IPro, PLLC

(57) ABSTRACT

Disclosed are a backlight module and a display device. An optical film includes a main body portion and at least one fixing portion connected to the main body portion, the main body portion is fixed to a light exit surface of a light guide plate, and the fixing portion is snap-fitted to a fixing surface of the light guide plate; the fixing portion is snap-fitted to the fixing surface of the light guide plate.

18 Claims, 15 Drawing Sheets

BACKLIGHT MODULE AND DISPLAY DEVICE

This application claims priority to Chinese Patent Application No. 202011277901.7, filed on Nov. 16, 2020, which is hereby incorporated by reference in its entirety.

FIELD

The present disclosure relates to the field of display, in particular to a backlight module and a display device.

BACKGROUND

A liquid crystal display (LCD) has been widely used in an electronic product such as a TV, a computer and a mobile phone due to many advantages such as thin body, power saving, and no radiation. The LCD is a passive light emitting display, and a display screen of the LCD itself does not emit light, but is illuminated by a backlight module behind the display screen.

SUMMARY

The embodiments of the present disclosure provide a backlight module and a display device.

The embodiment of the present disclosure provides a backlight module, including: a light guide plate, including a light incident surface and a light exit surface that are adjacent to each other, and at least one fixing surface adjacent to the light exit surface; an edge-lit light source, located on a side of the light incident surface of the light guide plate; and an optical film, including a main body portion and at least one fixing portion connected to the main body portion, wherein the main body portion is fixed to the light exit surface of the light guide plate, and the at least one fixing portion is snap-fitted to the at least one fixing surface of the light guide plate.

In some embodiments, the light guide plate further includes a bottom surface disposed opposite to the light exit surface, and the backlight module further includes a first reflective layer located at a side of the bottom surface of the light guide plate; the at least one fixing portion includes a first extension portion, where the first extension portion extends to the side of the bottom surface of the light guide plate along an end portion of a side, facing away from the main body portion, of the at least one fixing portion, and the first extension portion is snap-fitted to a side, facing away from the light guide plate, of the first reflective layer.

In some embodiments, the at least one fixing portion each is provided with the first extension portion.

In some embodiments, a fixing surface includes a first fixing surface arranged opposite to the light incident surface; and a fixing portion includes a first fixing portion, and the first fixing portion is snap-fitted to the first fixing surface.

In some embodiments, a fixing surface includes a second fixing surface and a third fixing surface that are adjacent to the light incident surface; and a fixing portion includes a second fixing portion and a third fixing portion, the second fixing portion is snap-fitted to the second fixing surface, and the third fixing portion is snap-fitted to the third fixing surface.

In some embodiments, the optical film further includes a fourth fixing portion connected to the main body portion; the fourth fixing portion is snap-fitted to a side, facing away from the light incident surface of the light guide plate, of the edge-lit light source.

In some embodiments, the backlight module further includes: a first reflective layer located on a side of a bottom surface of the light guide plate, a back plate located on a side, facing away from the light guide plate, of the first reflective layer, and a heat dissipation structure; the back plate includes a bottom plate and a side plate that are connected to each other, where the bottom plate is located on the side, facing away from the light guide plate, of the first reflective layer, and the side plate covers an outer side of a side edge of the light guide plate; the heat dissipation structure includes a first heat dissipation portion and a second heat dissipation portion that are connected to each other, the first heat dissipation portion and the second heat dissipation portion form an "L" shape, the first heat dissipation portion is located between the first reflective layer and the bottom plate, and the second heat dissipation portion is located between the edge-lit light source and the side plate; and the fourth fixing portion is snap-fitted between the second heat dissipation portion and the side plate, or the fourth fixing portion is snap-fitted to a side, facing away from the second heat dissipation portion, of the side plate.

In some embodiments, the fourth fixing portion is provided with a second extension portion, and the second extension portion extends to a side of the bottom surface of the light guide plate along an end portion of a side, facing away from the main body portion, of the fourth fixing portion; when the fourth fixing portion is snap-fitted between the second heat dissipation portion and the side plate, the second extension portion is snap-fitted between the first heat dissipation portion and the bottom plate; and when the fourth fixing portion is snap-fitted to the side, facing away from the second heat dissipation portion, of the side plate, the second extension portion is snap-fitted to a side, facing away from the light guide plate, of the bottom plate.

In some embodiments, the included angle between a fixing portion and the main body portion ranges from 60° to 100°.

In some embodiments, a joint between the main body portion and the at least one fixing portion has alternately arranged hollowed-out areas and connection areas, and the at least one fixing portion is formed by bending from the joint toward a side of the at least one fixing surface of the light guide plate.

In some embodiments, the optical film includes at least two stacked optical film layers, the respective optical film layers have the same structure, and the respective optical film layers constitute the optical film including the main body portion and the at least one fixing portion.

In some embodiments, the backlight module further includes a printed circuit board located between the second heat dissipation portion and the edge-lit light source.

In some embodiments, the backlight module further includes a second reflective layer located between the first fixing surface and the first fixing portion of the light guide plate.

In some embodiments, a light exit surface of the edge-lit light source is parallel to the light incident surface of the light guide plate, and the edge-lit light source is an LED light bar.

Correspondingly, an embodiment of the present disclosure also provides a display device, including the above-mentioned backlight module provided by the embodiments of the present disclosure, and a liquid crystal display panel located on the light exit surface of the backlight module.

In some embodiments, the above-mentioned display device provided by the embodiment of the present disclosure further includes a supporting frame arranged around the liquid crystal display panel and used for fixing the liquid crystal display panel and the backlight module, and the liquid crystal display panel and the backlight module are embedded in the supporting frame.

DETAILED DESCRIPTION OF THE EMBODIMENTS

In order to make the objectives, technical solutions and advantages of the present disclosure clearer, specific implementations of a backlight module and a display device provided by the embodiments of the present disclosure will be described in detail below in conjunction with the accompanying drawings. It should be understood that the preferred embodiments described below are only used to illustrate and explain the present disclosure, but not to limit the present disclosure. If there is no conflict, the embodiments in the present application and the features in the embodiments can be combined with each other.

The shapes and sizes of the components in the figures do not reflect the true proportions, and are only intended to illustrate the content of the present disclosure.

Figure 1:
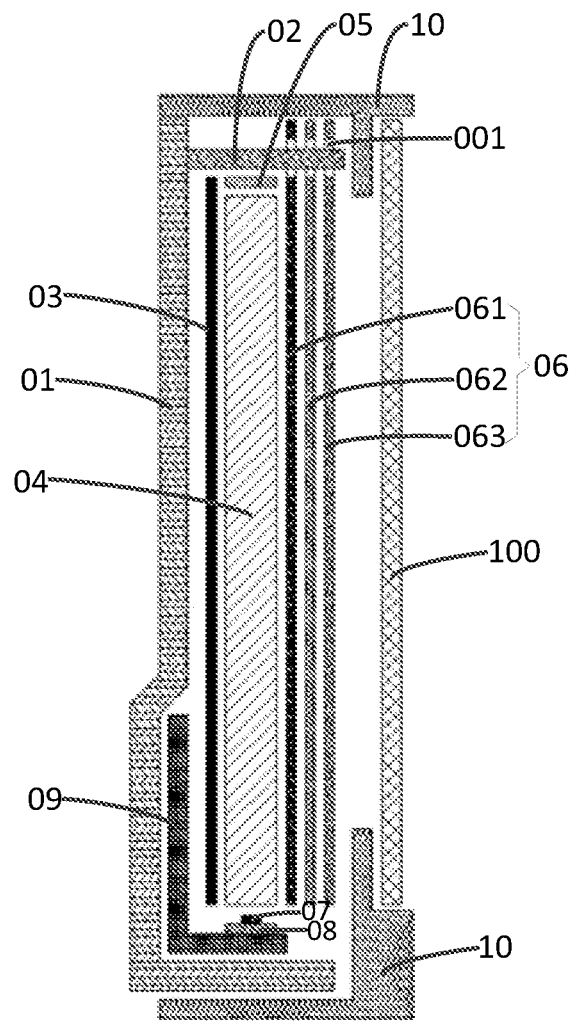
FIG. 1 is a structural schematic diagram of a liquid crystal display device in the related art.
Figure 2:
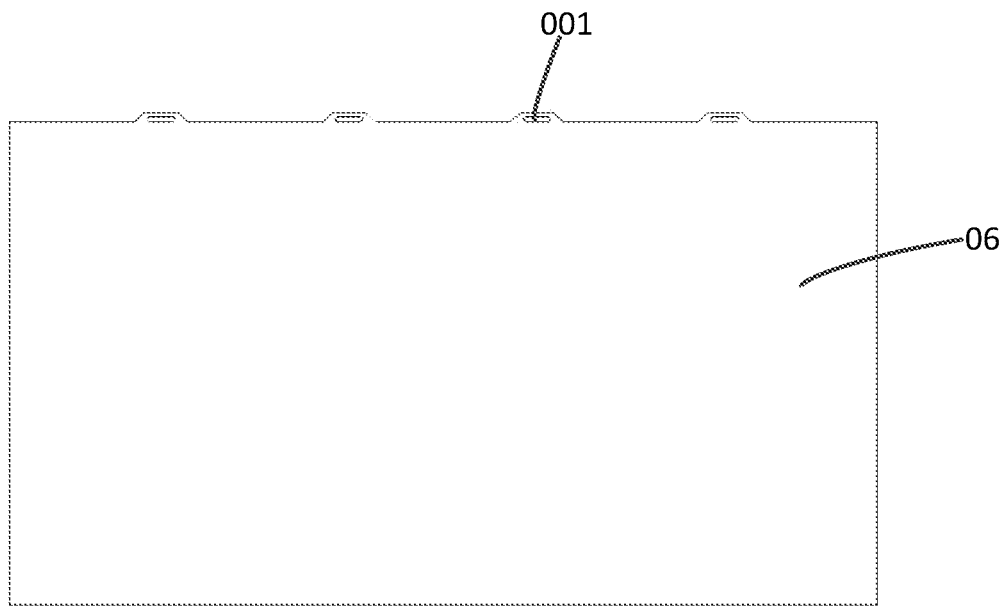
FIG. 2 is a structural schematic top view of an optical film in FIG. 1.
Figure 3:
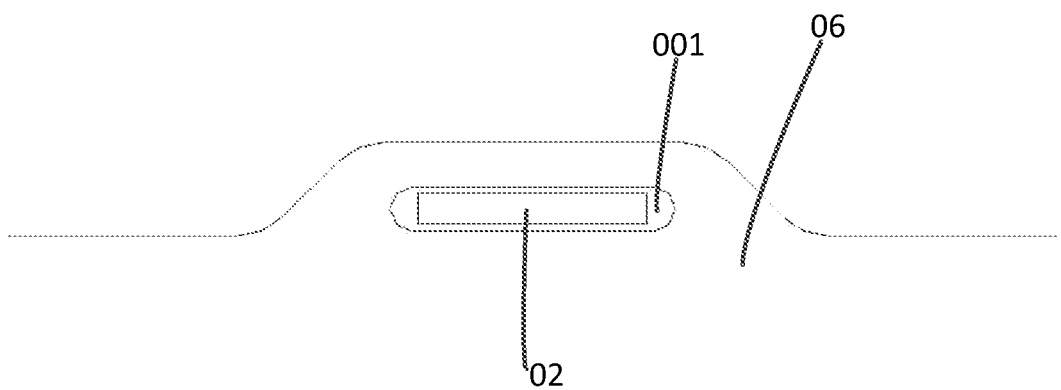
FIG. 3 is a partial enlarged schematic diagram of FIG. 2.

As the bezel of an LCD TV becomes narrower and narrower, requirements on the connection mode of an optical film (such as diffuser and prism sheet) of a backlight module and a back plate of the TV become high and higher, requiring both narrow bezel and firm connection. At present, in the connection modes of the optical film and the back plate, the most commonly used connection mode is to arrange multiple through holes on the upper side of the optical film, arrange multiple supports (sheet or cylindrical) on the back plate, and hang the optical film on the supports, as shown in FIG. 1, FIG. 1 is a cross-sectional view of the optical film hanging on the supports in the existing edge-lit liquid crystal display device. The edge-lit liquid crystal display device includes a backlight module and a liquid crystal display panel 100 which are oppositely arranged, wherein the backlight module includes a back plate 01, back plate supports 02, a first reflection sheet 03, a light guide plate 04, a second reflection sheet 05, an optical film 06, a light source 07, a printed circuit board 08, a heat sink 09 and a module frame 10, wherein the optical film 06 may include a diffuser 061, a prism sheet 062 and a brightness enhancement film 063, and of course, the optical film 06 may also be of other structures. When the liquid crystal display device is placed vertically, the upper side of the optical film 06 includes a plurality of through holes 001 corresponding to the back plate supports 02, and the optical film 06 is hung on the corresponding back plate supports 02 through the through holes 001. As shown in FIGS. 2 and 3, FIG. 2 is a structural schematic top view of the optical film 06 in FIG. 1, and FIG. 3 is a partial schematic enlarged view of FIG. 2. Although FIG. 1 can realize the fixing mode of hanging the optical film 06, the optical film 06 only partially bears the gravity of the main body of the optical film 06 at the positions of the through holes 001, and wave warping like curtains will appear at the horizontal direction of the optical film 06, and affected by the width of the through hole 001 and the peripheral width of the optical film 06, the non-visual bezel will be wider.

Figure 4:
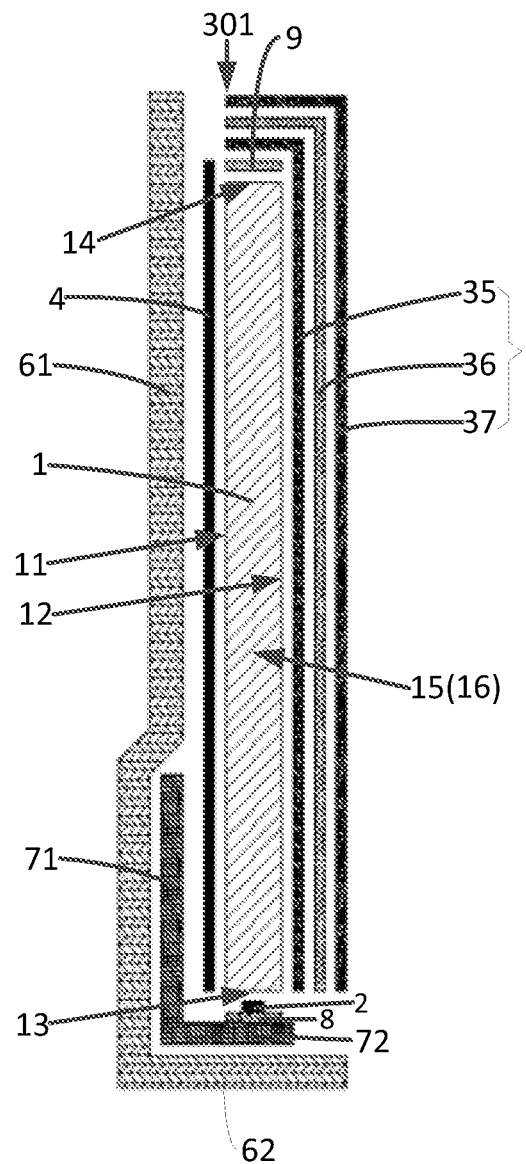
FIG. 4 is a structural schematic diagram of a backlight module provided by an embodiment of the present disclosure.
Figure 5:
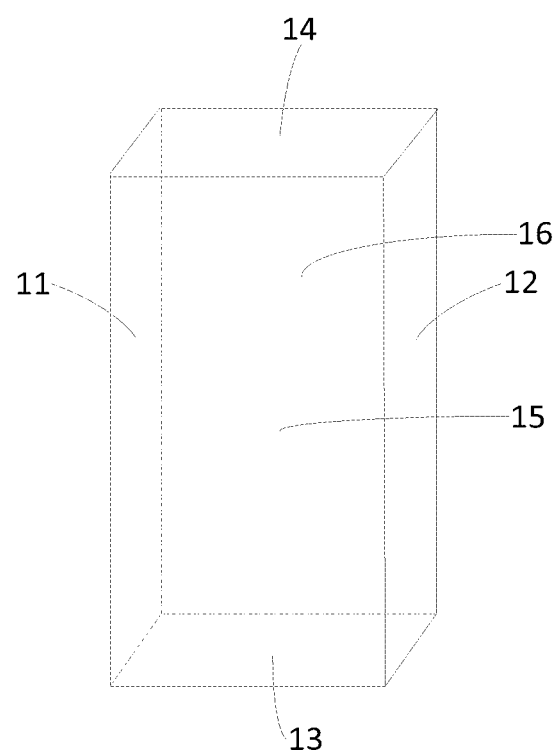
FIG. 5 is a three-dimensional schematic diagram of a light guide plate in FIG. 4.
Figure 6:
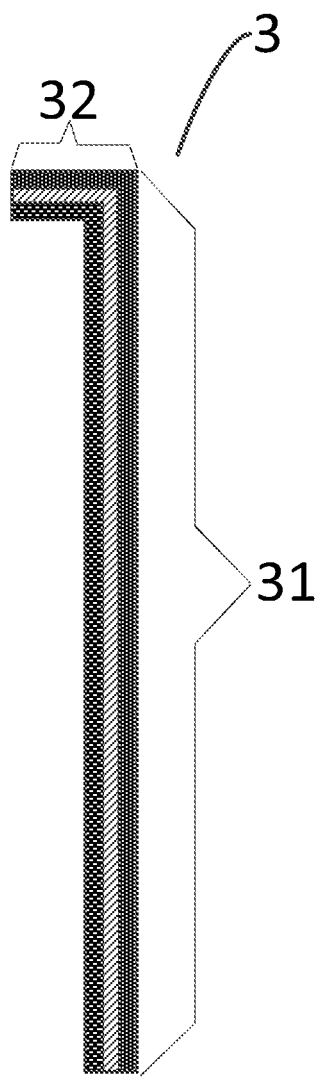
FIG. 6 is a schematic cross-sectional view of an optical film in FIG. 4.
Figure 7:
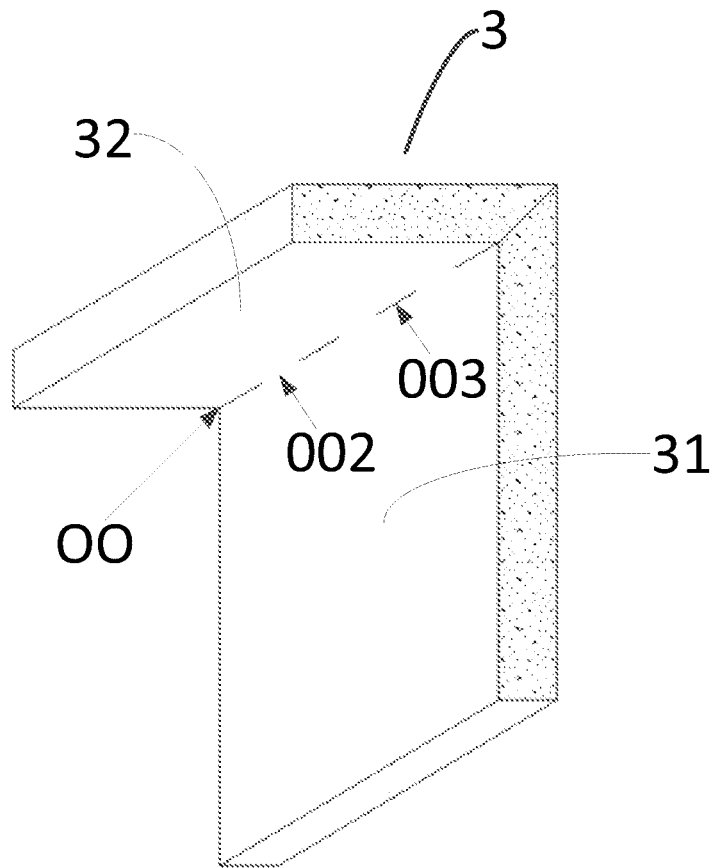
FIG. 7 is a three-dimensional schematic diagram of the optical film in FIG. 4.

In view of this, the present disclosure provides a backlight module, as shown in FIGS. 4-7, FIG. 4 is a schematic diagram of a cross-sectional structure of the backlight module, FIG. 5 is a schematic diagram of part of film layers in FIG. 4, FIG. 6 is a schematic diagram of part of the film layers in FIG. 4, FIG. 7 is a three-dimensional schematic diagram of FIG. 6.

The backlight module includes a light guide plate 1. As shown in FIGS. 4 and 5, the light guide plate 1 includes a light incident surface 13 and a light exit surface 12 that are adjacent to each other, and at least one fixing surface adjacent to the light exit surface 12. As shown in FIGS. 4 and 5, the shape of the light guide plate 1 is a cuboid, where the cuboid includes three pairs of side faces oppositely arranged, of which one pair of side faces are oppositely arranged bottom surface 11 and light exit surface 12, and one pair of side faces are oppositely arranged light incident surface 13 and one of the side edges 14, and one pair of side faces are the other two opposite side edges 15 and 16. At least one of the side edges 14, 15 and 16 is used as a fixing surface, for example, the side edge 14 is a first fixing surface 14, the side edge 15 is a second fixing surface 15, and the side edge 16 is a third fixing surface 16.

The backlight module further includes an edge-lit light source 2, located on a side of the light incident surface 13 of the light guide plate 1.

The backlight module further includes an optical film 3. As shown in FIGS. 4, 6 and 7, the optical film 3 includes a main body portion 31 and at least one fixing portion connected to the main body portion 31. The fixing porting is, for example, a first fixing portion 32 fixed to the first fixing surface 14, a second fixing portion 33 fixed to the second fixing surface 15, and a third fixing portion 34 fixed to the third fixing surface 16, which will be described later. FIG. 4, FIG. 6 and FIG. 7 take the optical film 3 including a first fixing portion 32 as an example, the main body portion 31 is fixed to the light exit surface 12 of the light guide plate 1, and the fixing portion is snap-fitted at the fixing surface of the light guide plate 1 (for example, the first fixing portion 32 is snap-fitted at the first fixing surface 14 of the light guide plate 1).

In the above-mentioned backlight module provided by the embodiment of the present disclosure, the optical film 3 includes the main body portion 31 and the at least one fixing portion connected to the main body portion 31. The main body portion 31 is fixed to the light exit surface 12 of the light guide plate 1, and the fixing portion is snap-fitted to the fixing surface of the light guide plate 1 (for example, the first fixing portion 32 is snap-fitted to the first fixing surface 14 of the light guide plate 1), so that the fixing portion can evenly bear the gravity of the main body portion 31, so that the whole picture displayed by the liquid crystal display device is flat; the fixing portion is snap-fitted to the fixing surface of the light guide plate 1, so that the width of the non-visible bezel of the liquid crystal display device can be reduced; and the fixing portion is snap-fitted to the fixing surface of the light guide plate 1 (for example, the first fixing portion 32 is snap-fitted to the first fixing surface 14 of the light guide plate 1), the arrangement of the back plate supports 02 in the related art (FIG. 1) can be eliminated, thereby reducing the cost.

Specifically, as shown in FIGS. 1 and 4, the optical film 06 in FIG. 1 is equivalent to the optical film 3 in FIG. 4 of the present disclosure. FIG. 4 takes the first fixing portion 32 of the optical film 3 being snap-fitted to the upper side of the light guide plate 1 as an example, and FIGS. 1 and 4 both take the optical film including three layers as an example, and a thickness of each layer is between 0.1 mm and 0.6 mm. Therefore, the total superimposed thickness of the three film layers located on the first fixing surface 14 of the light guide plate 1 in FIG. 4 of the present disclosure is between 0.3 mm and 1.8 mm; the minimum width of the through hole 001 in FIG. 1 is about 1 mm, and the minimum length of a convex edge on the upper side of the through hole 001 is about 1.8 mm. That is, the width of the non-visible bezel occupied by only the optical film 06 in FIG. 1 is about 2.8 mm, so the present disclosure can reduce the width of the non-visible bezel to 1 mm to 2.5 mm. The larger the size of the liquid crystal display device, the larger the width of the through hole 001 and the length of the convex edge in the prior art, so the present disclosure can greatly reduce the width of the non-visible bezel.

It should be noted that, as shown in FIG. 1 and FIG. 4, the various film layers in the backlight module are in contact with each other during actual fabrication. The embodiment of the present disclosure is only for schematically illustrating the structure of the film layers.

In specific implementation, in the above-mentioned backlight module provided by the embodiments of the present disclosure, as shown in FIG. 4, the optical film 3 includes at least two stacked optical film layers, for example, including a first optical film layer 35, a second optical film layer 36 and a third optical film layer 37. The respective optical film layers (i.e., 35, 36 and 37) have the same structure, and the respective optical film layers (i.e., 35, 36 and 37) constitute the optical film 3 including the main body portion 31 and the at least one fixing portion. In some embodiments, the first optical film layer 35 is a diffuser, the second optical film layer 36 is a prism sheet or a multilayer prism sheet, and the third optical film layer 37 is a prism sheet or a multilayer film or a polarizing brightness enhancement film.

In specific implementation, in order to ensure that the optical film can be firmly fixed to the fixing surface and the light exit surface of the light guide plate, in the above-mentioned backlight module provided by the embodiments of the present disclosure, as shown in FIG. 4, FIG. 6 and FIG. 7, the included angle between the fixing portion and the main body portion 31 ranges from 60° to 100°, such as 60°, 90°, 100°, etc.

Figure 8:
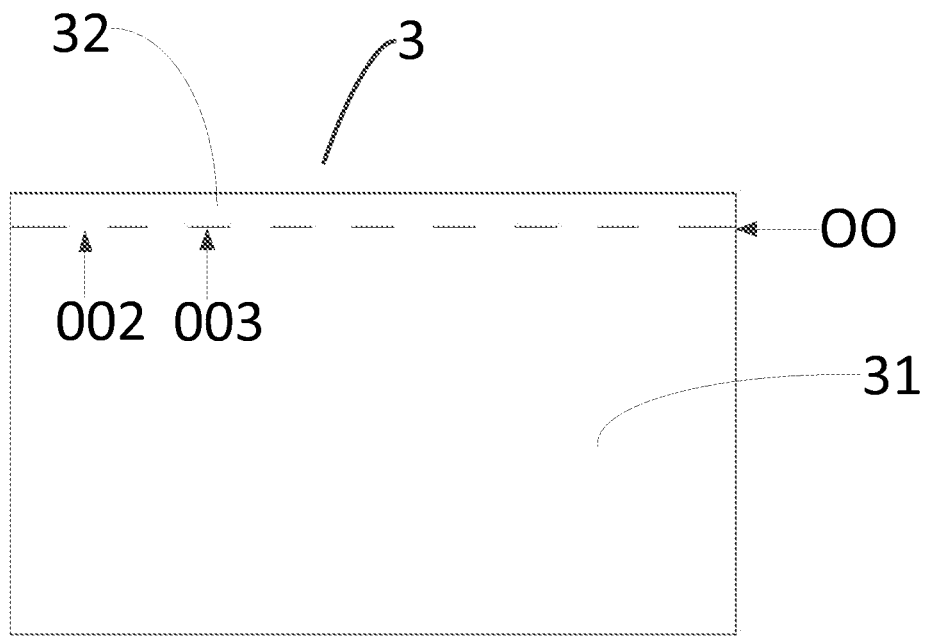
FIG. 8 is a schematic diagram of FIG. 7 before bending.

In specific implementation, in the above-mentioned backlight module provided by the embodiments of the present disclosure, as shown in FIG. 7 and FIG. 8, FIG. 8 is a structural schematic top view of FIG. 7 before bending. A joint OO between the main body portion 31 and the first fixing portion 32 has hollowed-out areas 003 alternately arranged and connection areas 002. The first fixing portion 32 is formed by bending from the joint OO towards a side of the first fixing surface 14 of the light guide plate 1. FIGS. 4, 7 and 8 take an optical film 3 including a first fixing portion 32 as an example, before the optical film 3 is snap-fitted to the first fixing surface 14 of the light guide plate 1, a perforated line is arranged on the fixing edge of the optical film 3, and the perforated line includes the alternately arranged hollowed-out areas 003 and connection areas 002 of the joint OO. When the optical film 3 is assembled, the first fixing portion 32 on an outer edge of the perforated line (joint OO) of the optical film 3 is bent for 90 degrees along the perforated line, and the perforated line (joint OO) is aligned with an edge of the first fixing surface 14 of the light guide plate 1, and the first fixing portion 32 of the optical film 3 is attached to the first fixing surface 14 of the light guide plate 1, and the main body portion 31 of the optical film 3 is attached to the light exit surface 12 of the light guide plate 1. Since the optical film 3 includes at least two optical film layers (such as 35, 36 and 37), all the optical film layers can be assembled in sequence using the same method as described above.

It should be noted that the above-mentioned joint OO is an intermittent dashed line that is cut and penetrated by a cutting die at a certain distance. The film on two sides of the joint OO will not be disconnected, but can be folded in half along the joint OO.

In specific implementation, in the above-mentioned backlight module provided by the embodiment of the present disclosure, as shown in FIG. 4, an edge 301, far away from the main body portion 31, of the first fixing portion 32 can be flush with a bottom surface 11 of the light guide plate 1, where the bottom surface 11 is provided with dots that can scatter light. FIG. 4 takes the optical film 3 including a main body portion 31 and a fixing portion 32 connected to the main body portion 31 as an example, and the first fixing portion 32 is snap-fitted to the opposite side (the first fixing surface 14) of the light incident surface 13 of the light guide plate 1, the length of the first fixing portion 32 can be set according to the length of the first fixing surface 14 of the light guide plate 1, and the length of the first fixing surface 14 can be equal to the length of the first fixing portion 32, so that the edge 301, far away from the main body portion 31, of the first fixing portion 32 is flush with the bottom surface 11 of the light guide plate 1.

Figure 9:
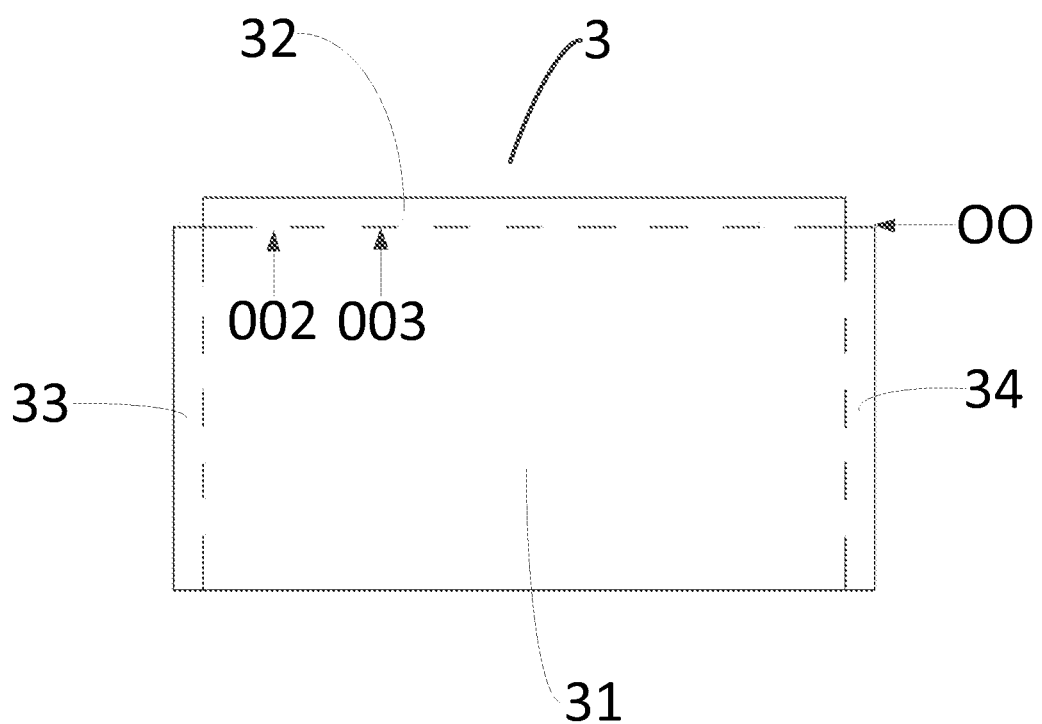
FIG. 9 is a structural schematic diagram of an optical film provided with three fixing portions.

In some embodiments, a fixing portion corresponding to the second fixing surface 15 or the third fixing surface 16 is arranged in the optical film 3. As shown in FIG. 9, an upper side, a left side and a right side of the optical film 3 are respectively provided with a first fixing portion 32, a second fixing portion 33 and a third fixing portion 34. When the optical film 3 as shown in FIG. 9 is snap-fitted to the light guide plate 1, the first fixing portion 32, the second fixing portion 33 and the third fixing portion 34 are bent along the joint, so that the first fixing portion 32 is snap-fitted to the first fixing surface 14, the second fixing portion 33 is snap-fitted to the second fixing surface 15, and the third fixing portion 34 is snap-fitted to the third fixing surface 16.

Figure 10:
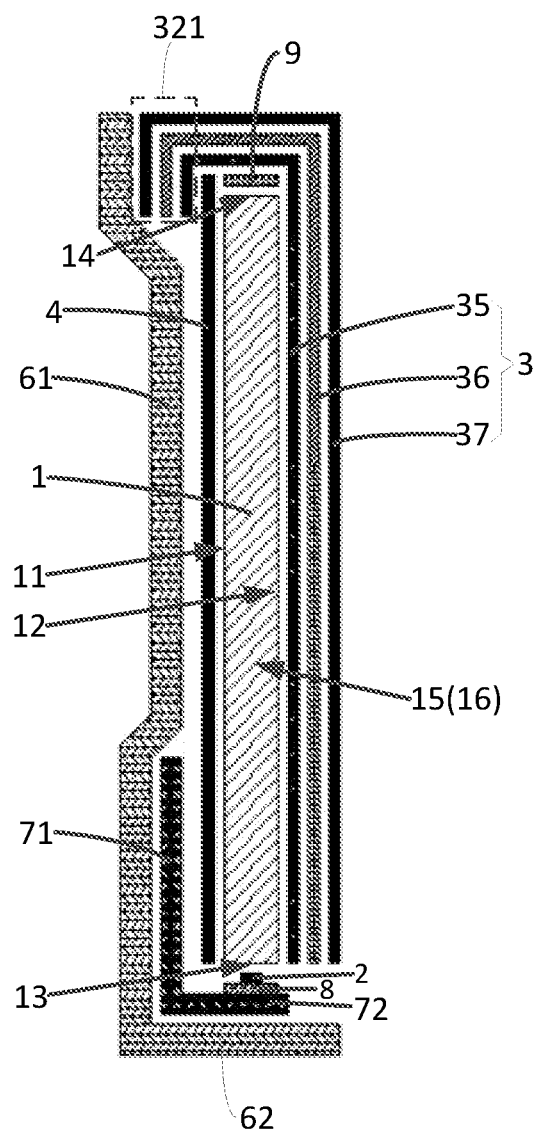
FIG. 10 is a structural schematic diagram of yet another backlight module provided by an embodiment of the present disclosure.
Figure 11:
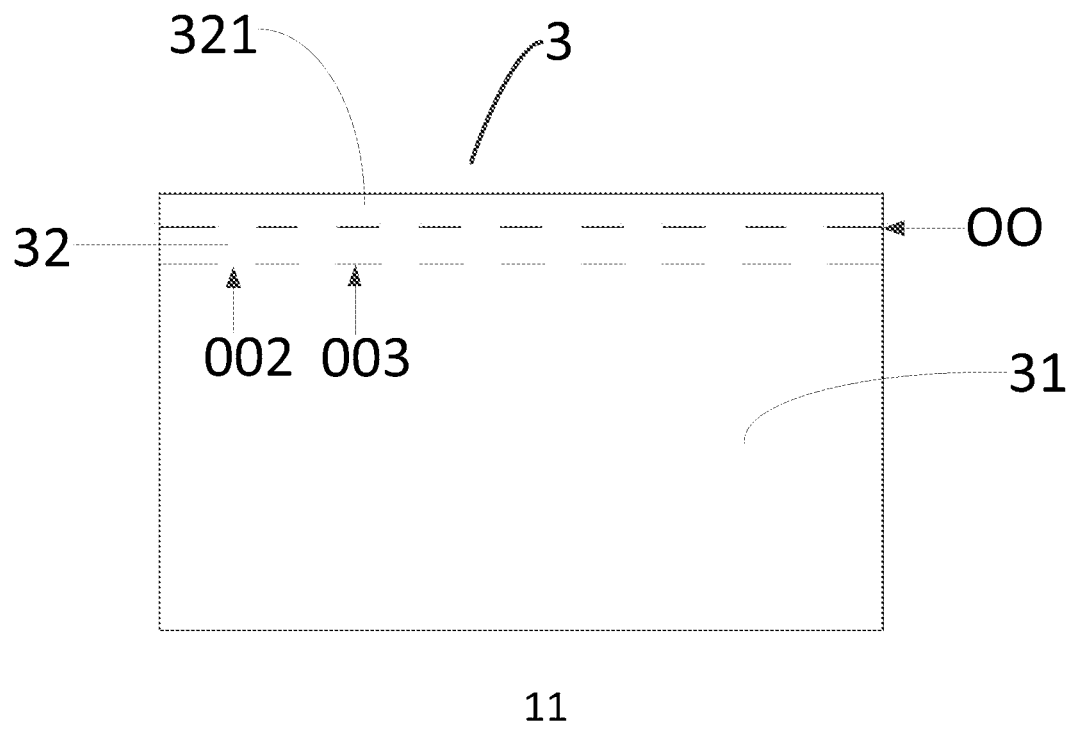
FIG. 11 is a structural schematic diagram of an optical film provided with a first extending portion in FIG. 8.

In specific implementation, in the above-mentioned backlight module provided by the embodiments of the present disclosure, as shown in FIG. 10 and FIG. 11, the light guide plate 1 includes a bottom surface 11 arranged opposite to the light exit surface 12, where the bottom surface 11 is provided with dots that can scatter light. The backlight module further includes a first reflective layer 4 located on a side of the bottom surface 11 of the light guide plate 1.

In some embodiments, at least one fixing portion includes a first extension portion. For example, the first fixing portion 32 includes a first extension portion 321, and the first extension portion extends to a side of the bottom surface of the light guide plate along an end portion of a side, facing away from the main body portion, of the fixing portion, for example, the first extension portion 321 extends to a side of the bottom surface 11 of the light guide plate along the end portion of the side, facing away from the main body portion 31, of the first fixing portion 32, and the first extension portion 321 is snap-fitted to the side, facing away from the light guide plate 1, of the first reflective layer 4. The arrangement of the first extension portion 321 can further enhance the assembling firmness of the optical film 3.

When the optical film 3 as shown in FIG. 10 is assembled, the first fixing portion 32 is installed with reference to the foregoing. After the first fixing portion 32 is installed, the joint between the first extension portion 321 and the first fixing portion 32 in FIG. 11 is aligned with the edge of the first reflective layer 4, and the first extension portion 321 is bent for 90 degrees again along the joint between the first extension portion 321 and the first fixing portion 32 to be attached to the left side of the first reflective layer 4.

In specific implementation, in the above-mentioned backlight module provided by the embodiments of the present disclosure, as shown in figures, all the fixing portions (for example, the first fixing portion 32, the second fixing portion 33 and the third fixing portion 34) each are provided with a first extension portion. In such a way, the assembly firmness of the optical film can further be enhanced.

In specific implementation, in the above-mentioned backlight module provided by the embodiments of the present disclosure, as shown in FIG. 4, FIG. 6 and FIG. 7, the fixing surface includes a first fixing surface 14 disposed opposite to the light incident surface 13.

The fixing portion includes a first fixing portion 32, and the first fixing portion 32 is snap-fitted to the first fixing surface 14. In this way, the first fixing portion 32 can uniformly bear the gravity of the main body portion 31, so that the whole picture displayed by the liquid crystal display device is flat; the first fixing portion 32 is snap-fitted to the first fixing surface 14 of the light guide plate 1, so that the width of the non-visible bezel of the liquid crystal display device can be reduced; and the first fixing portion 32 is snap-fitted to the first fixing surface 14 of the light guide plate 1, so that the arrangement of the back plate supports 02 in the related art (FIG. 1) can be reduced, thereby reducing costs.

In specific implementation, in the above-mentioned backlight module provided by the embodiments of the present disclosure, as shown in FIGS. 9 and 10, the fixing surface includes a second fixing surface 15 and a third fixing surface 16 that are adjacent to the light incident surface 13.

The fixing portion includes a second fixing portion 33 and a third fixing portion 34, the second fixing portion 33 is snap-fitted to the second fixing surface 15, and the third fixing portion 34 is snap-fitted to the third fixing surface 16. By arranging fixing portions on the three fixing surfaces of the light guide plate 1, the optical film 3 can be firmly fixed.

Figure 12:
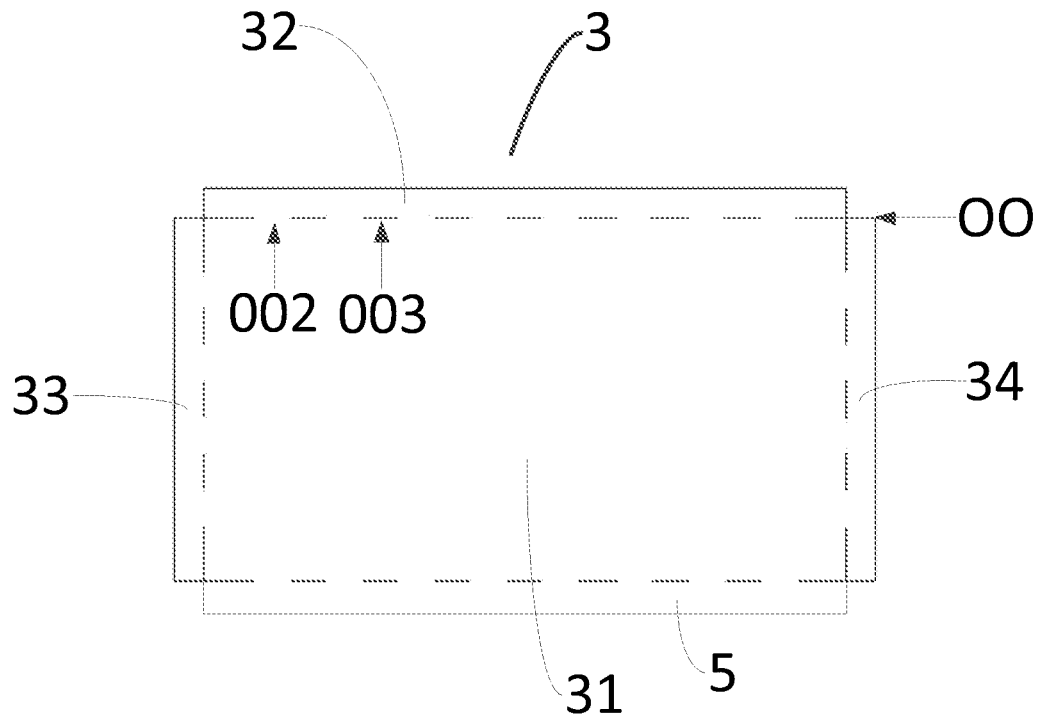
FIG. 12 is a structural schematic diagram of an optical film provided with four fixing portions.
Figure 13:
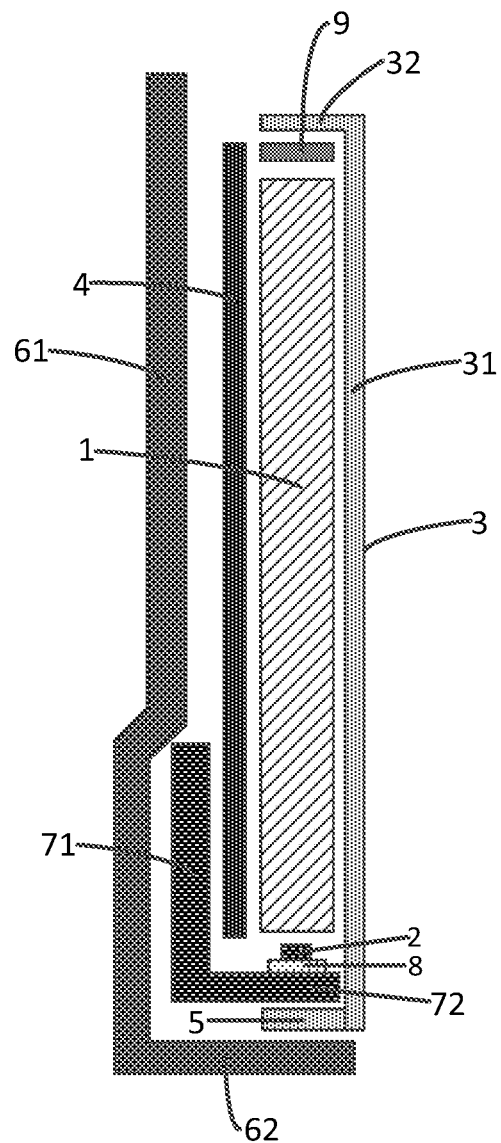
FIG. 13 is a structural schematic diagram of yet another backlight module provided by an embodiment of the present disclosure.
Figure 14:
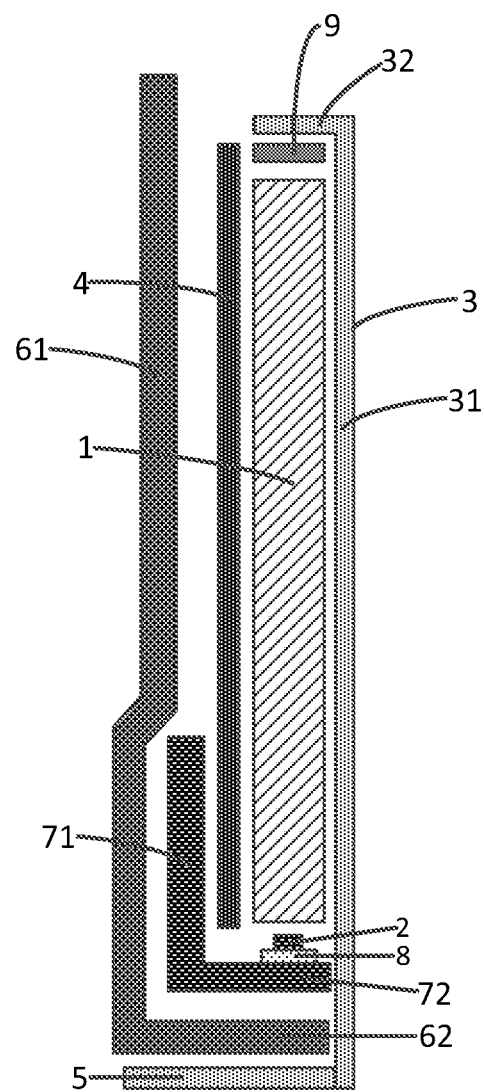
FIG. 14 is a structural schematic diagram of yet another backlight module provided by an embodiment of the present disclosure.

In specific implementation, in the above-mentioned backlight module provided by the embodiments of the present disclosure, as shown in FIGS. 12-14, the optical film 3 further includes a fourth fixing portion 5 connected to the main body portion 31; in order to prevent the fourth fixing portion 5 from blocking the light emitted by the edge-lit light source 2, and the fourth fixing portion 5 is snap-fitted to the side, facing away from the light incident surface 13 of the light guide plate 1, of the edge-lit light source 2.

In specific implementation, the above-mentioned backlight module provided by the embodiments of the present disclosure, as shown in FIG. 13 and FIG. 14, further includes a first reflective layer 4 located on a side of the bottom surface 11 of the light guide plate 1, a back plate 6 located on the side, facing away from the light guide plate 1, of the first reflective layer 4, and a heat dissipation structure 7.

The back plate 6 includes a bottom plate 61 and a side plate 62 that are connected to each other. The bottom plate 61 is located on the side, facing away from the light guide plate 1, of the first reflective layer 4, and the side plate 62 covers the outer side of the side edge of the light guide plate 1.

The heat dissipation structure 7 includes a first heat dissipation portion 71 and a second heat dissipation portion 72 that are connected to each other. The first heat dissipation portion 71 and the second heat dissipation portion 72 form an "L" shape, the first heat dissipation portion 71 is located between the first reflective layer 4 and the bottom plate 61, and the second heat dissipation portion 72 is located between the edge-lit light source 2 and the side plate 62.

As shown in FIG. 13, the fourth fixing portion 5 is snap-fitted between the second heat dissipation portion 72 and the side plate 62, or as shown in FIG. 14, the fourth fixing portion 5 is snap-fitted to the side, facing away from the second heat dissipation portion 72, of the side plate 62.

When the optical film 3 shown in FIG. 13 and FIG. 14 is assembled, assuming that the optical film 3 is provided with a first fixing portion 32, a second fixing portion 33, a third fixing portion 34 and a fourth fixing portion 5, first, the first optical film layer 35 is fixed, the fixing portions on the outer edges of the four perforated lines of the first optical film layer 35 are bent for 90 degrees along the perforated lines, and the perforated lines are aligned with the side lines of the three fixing surfaces of the light guide plate 1 and the lower side of the back plate 6, the four fixing portions are respectively attached to the upper side, and side edges of the left and right sides of the light guide plate 1, and the lower side of the back plate 6, and the main body portion 31 is attached to the light exit surface 12 on the right side of the light guide plate 1; the fourth fixing portion 5 in FIG. 13 is snap-fitted between the second heat dissipation portion 72 and the side plate 62, and the fourth fixing portion 5 in FIG. 14 is snap-fitted to the side, facing away from the second heat dissipation portion 72, of the side plate 62. Then, the second optical film layer 36 and the third optical film layer 37 are fixed in the same manner as described above.

Figure 15:
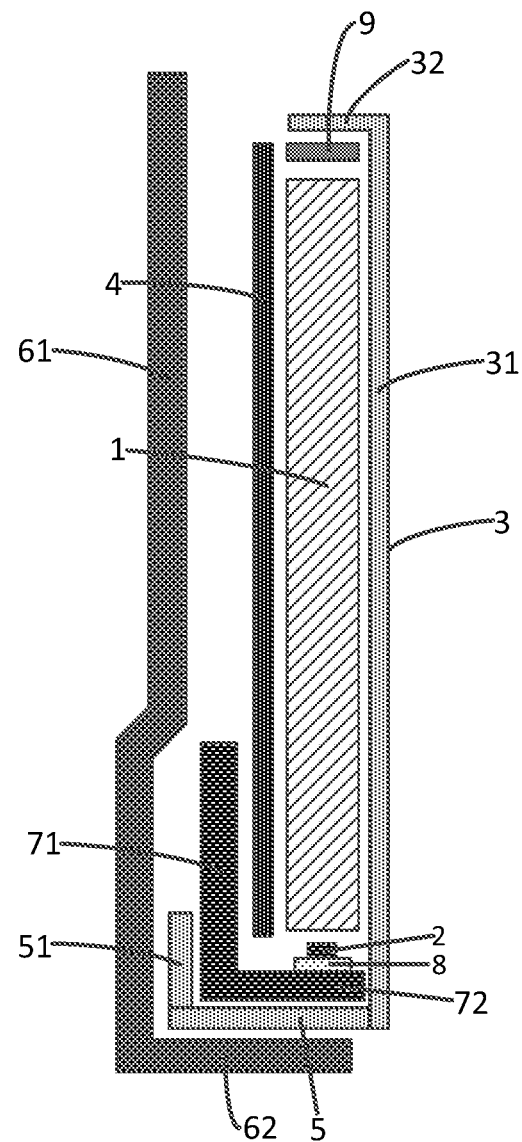
FIG. 15 is a structural schematic diagram of yet another backlight module provided by an embodiment of the present disclosure.
Figure 16:
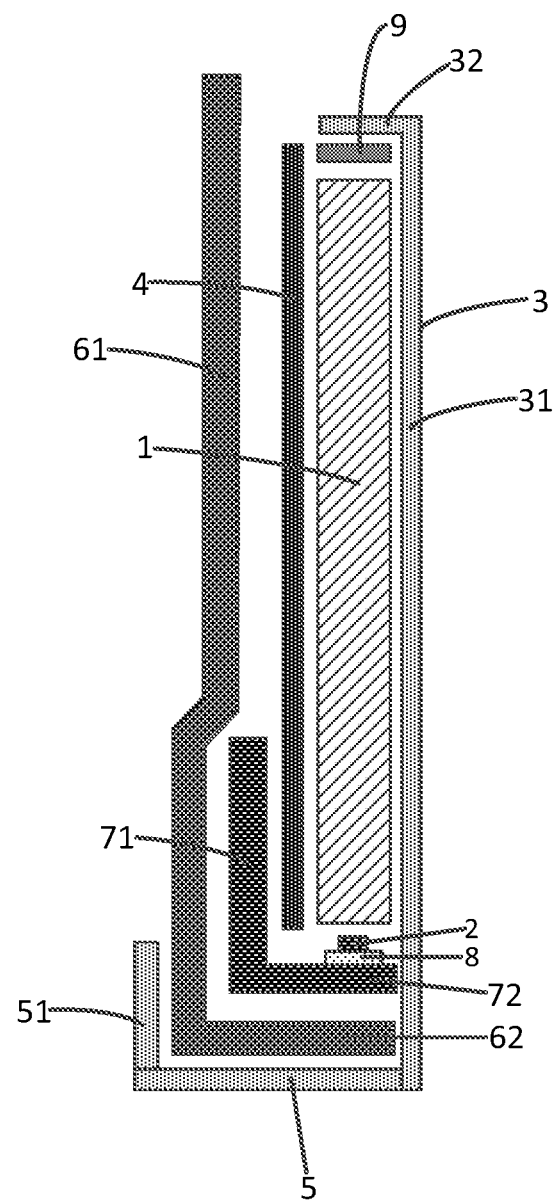
FIG. 16 is a structural schematic diagram of yet another backlight module provided by an embodiment of the present disclosure.

In specific implementation, in the above-mentioned backlight module provided by the embodiments of the present disclosure, as shown in FIGS. 15 and 16, the fourth fixing portion 5 is provided with a second extension portion 51, and the second extension portion 51 extends to the dot surface 11 side along the end portion of the side, facing away from the main body portion 31, of the fourth fixing portion 5.

As shown in FIG. 15, when the fourth fixing portion 5 is fixed between the second heat dissipation portion 72 and the side plate 62, the second extension portion 51 is fixed between the first heat dissipation portion 71 and the bottom plate 61.

As shown in FIG. 16, when the fourth fixing portion 5 is fixed to the side, facing away from the second heat dissipation portion 72, of the side plate 62, the second extension portion is snap-fitted to the side, facing away from the light guide plate 1, of the bottom plate 61.

When the optical film 3 shown in FIG. 15 and FIG. 16 is assembled, the first fixing portion 32, the second fixing portion 33, the third fixing portion 34, the fourth fixing portion 5 and the corresponding first extension portion 321 are installed with reference to the foregoing. After the first fixing portion 32, the second fixing portion 33, the third fixing portion 34, the fourth fixing portion 5 and the corresponding first extension portion 321 are installed, the second extension portion 51 in FIGS. 15 and 16 is bent for 90 degrees along the joint, the second extension portion 51 in FIG. 15 is snap-fitted between the first heat dissipation portion 71 and the bottom plate 61, and the second extension portion 51 in FIG. 16 is snap-fitted to the side, facing away from the light guide plate 1, of the bottom plate 61.

In specific implementation, in the above-mentioned backlight module provided by the embodiments of the present disclosure, as shown in FIG. 4, FIG. 10, and FIGS. 13-16, the light exit surface of the edge-lit light source 2 is parallel to the light incident surface 13 of the light guide plate 1, and the edge-lit light source 2 is an LED light bar.

In specific implementation, in the above-mentioned backlight module provided by the embodiments of the present disclosure, as shown in FIGS. 4, 10, and 13-16, the backlight module further includes a printed circuit board 8 located between the second heat dissipation portion 72 and the edge-lit light source 2, the printed circuit board 8 is used for being electrically connected with the positive and negative poles of the LED light bar, so as to input voltage signals to the positive and negative poles of the LED light bar through the power supply to make the LED light bar emit light.

In specific implementation, in the above-mentioned backlight module provided by the embodiments of the present disclosure, as shown in FIGS. 4, 10, and 13-16, the backlight module further includes a second reflective layer 9 located between the first fixing surface 14 and the first fixing portion 32 of the light guide plate 1, and the second reflective layer 9 is used for reflecting the light emitted from the first fixing surface 14 of the light guide plate 1 to the light guide plate 1 to improve the light extraction efficiency of the light guide plate 1.

It should be noted that FIGS. 13-16 of the embodiments of the present disclosure are provided with a fourth fixing portion and a second extension portion on the basis of FIG. 4. The fourth fixing portion and the second extension portion may also be arranged on the basis of FIG. 10.

Specifically, except that the structure of the optical film layer 3 in FIG. 4 is different from the structure of the optical film layer 3 in FIG. 10, the rest of the film layers are the same.

Figure 17:
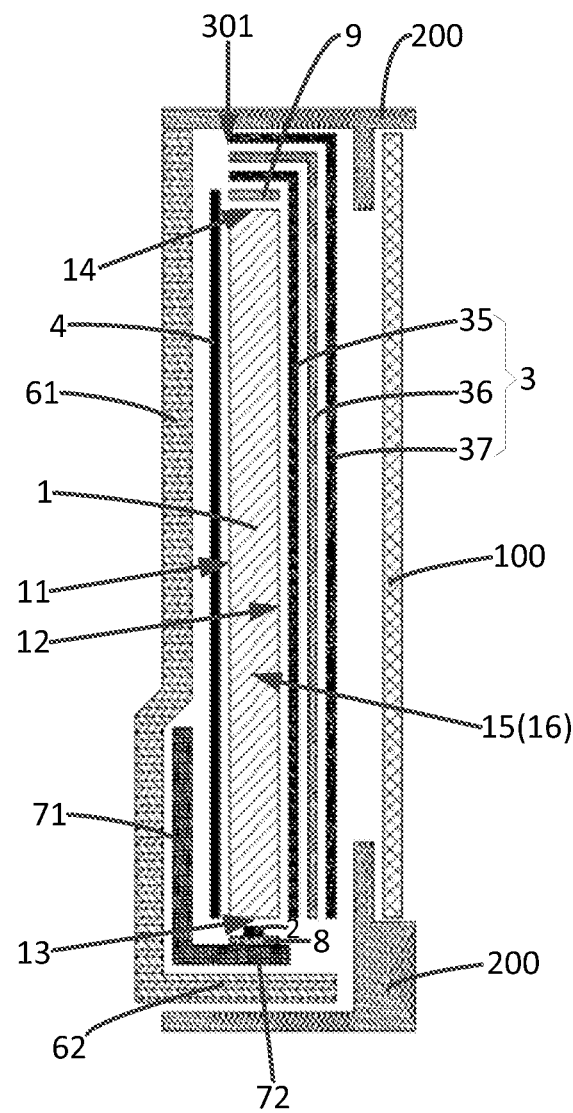
FIG. 17 is a structural schematic diagram of a display device provided by an embodiment of the present disclosure.
Figure 18:
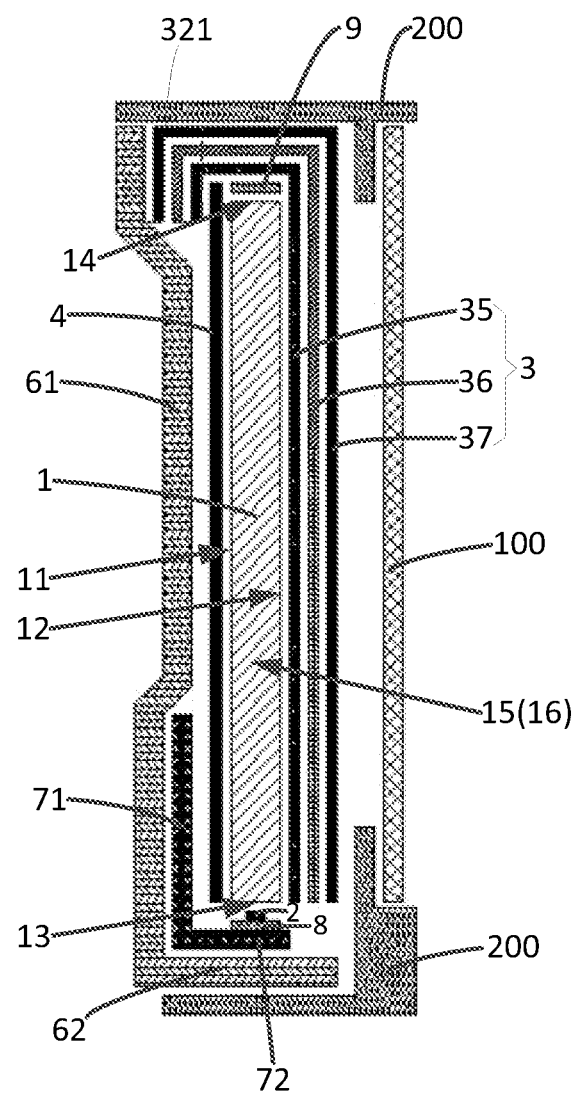
FIG. 18 is a structural schematic diagram of yet another display device provided by an embodiment of the present disclosure.

Based on the same inventive concept, an embodiment of the present disclosure also provides a display device, as shown in FIGS. 17 and 18, including: the above-mentioned backlight module disclosed in the present disclosure, and a liquid crystal display panel 100 located on the light exit surface of the backlight module.

It should be noted that FIGS. 17 and 18 of the embodiment of the present disclosure adopt the backlight modules corresponding to FIGS. 4 and 10, respectively. Of course, the backlight modules shown in FIGS. 13-16 can also be adopted.

In specific implementation, the above-mentioned display device provided by the embodiment of the present disclosure, as shown in FIG. 17 and FIG. 18, includes a supporting frame 200 arranged around the liquid crystal display panel 100 and used for fixing the liquid crystal display panel 100, and the liquid crystal display panel 100 and the backlight module are embedded in the supporting frame 200.

Specifically, as shown in FIGS. 17 and 18, the supporting frame 200 is a metal supporting frame, and the supporting frame 200 surrounds and fixes the optical film 3 to the back plate 6, and all the fixing portions of the optical film 3 are clamped and fixed by the supporting frame 200 and the light guide plate 1.

The display device may be any product or component with a display function, such as a mobile phone, a tablet computer, a television, a display, a notebook computer, a digital photo frame and a navigator. The other indispensable components of the display device should be understood by those of ordinary skill in the art, and will not be repeated here, and should not be used as a limitation to the present disclosure. The problem solving principle of the display device is similar to the problem solving principle of the aforementioned display panel. Therefore, the implementation of the display device can refer to the implementation of the aforementioned display panel, and the repetitions will not be repeated here.

According to the backlight module and the display device provided by the embodiments of the present disclosure, the optical film is configured to include a main body portion and at least one fixing portion connected to the main body portion, the main body portion is fixed on the light exit surface of the light guide plate, and the fixing portion is snap-fitted to the fixing surface of the light guide plate, in such a way, the fixing portion can evenly bear the gravity of the main body portion, so that the whole picture displayed by the liquid crystal display device is flat; the fixing portion is snap-fitted to the fixing surface of the light guide plate, so that the width of the non-visual bezel of the liquid crystal display device. can be reduced; and the fixing portion is snap-fitted to the fixing surface of the light guide plate, so that the arrangement of the back plate supports in the prior art can be eliminated, thereby reducing the cost.

Obviously, those skilled in the art can make various changes and variations to the present disclosure without departing from the spirit and scope of the present disclosure. In this way, if these modifications and variations of the present disclosure fall within the scope of the claims of the present disclosure and their equivalent technologies, the present disclosure is also intended to include these changes and variations.

The invention claimed is:

1. A backlight module, comprising:
   a light guide plate, comprising a light incident surface and a light exit surface adjacent to each other, and at least one fixing surface adjacent to the light exit surface;

an edge-lit light source, located on a side of the light incident surface of the light guide plate; and an optical film, comprising a main body portion and at least one fixing portion connected to the main body portion, wherein the main body portion is fixed to the light exit surface of the light guide plate, and the at least one fixing portion is snap-fitted to the at least one fixing surface of the light guide plate;

wherein the optical film further comprises a fourth fixing portion connected to the main body portion; the fourth fixing portion is snap-fitted to a side, facing away from the light incident surface of the light guide plate, of the edge-lit light source;

wherein the backlight module further comprises: a first reflective layer located on a side of a bottom surface of the light guide plate, a back plate located on a side, facing away from the light guide plate, of the first reflective layer, and a heat dissipation structure;

the back plate comprises a bottom plate and a side plate connected to each other, wherein the bottom plate is located on the side, facing away from the light guide plate, of the first reflective layer, and the side plate covers an outer side of a side edge of the light guide plate;

the heat dissipation structure comprises a first heat dissipation portion and a second heat dissipation portion connected to each other, wherein the first heat dissipation portion and the second heat dissipation portion form an "L" shape, the first heat dissipation portion is located between the first reflective layer and the bottom plate, and the second heat dissipation portion is located between the edge-lit light source and the side plate; and the fourth fixing portion is snap-fitted between the second heat dissipation portion and the side plate, or the fourth fixing portion is snap-fitted to a side, facing away from the second heat dissipation portion, of the side plate.

2. The backlight module according to claim 1, wherein the light guide plate further comprises a bottom surface disposed opposite to the light exit surface, and the backlight module further comprises a first reflective layer located on a side of the bottom surface of the light guide plate;

the at least one fixing portion comprises a first extension portion, wherein the first extension portion extends to the side of the bottom surface of the light guide plate along an end portion of a side, facing away from the main body portion, of the at least one fixing portion, and the first extension portion is snap-fitted to a side, facing away from the light guide plate, of the first reflective layer.

3. The backlight module according to claim 2, wherein the at least one fixing portion each is provided with the first extension portion.

4. The backlight module according to claim 1, wherein a fixing surface comprises a first fixing surface arranged opposite to the light incident surface; and a fixing portion comprises a first fixing portion, and the first fixing portion is snap-fitted to the first fixing surface.

5. The backlight module according to claim 4, wherein the backlight module further comprises a second reflective layer located between the first fixing surface and the first fixing portion of the light guide plate.

6. The backlight module according to claim 1, wherein a fixing surface comprises a second fixing surface and a third fixing surface adjacent to the light incident surface; and a fixing portion comprises a second fixing portion and a third fixing portion, the second fixing portion is snap-fitted to the second fixing surface, and the third fixing portion is snap-fitted to the third fixing surface.

7. The backlight module according to claim 1, wherein the fourth fixing portion is provided with a second extension portion, and the second extension portion extends to a side of the bottom surface of the light guide plate along an end part of a side, facing away from the main body portion, of the fourth fixing portion;

when the fourth fixing portion is snap-fitted between the second heat dissipation portion and the side plate, the second extension portion is snap-fitted between the first heat dissipation portion and the bottom plate;

when the fourth fixing portion is snap-fitted to the side, facing away from the second heat dissipation portion, of the side plate, the second extension portion is snap-fitted to a side, facing away from the light guide plate, of the bottom plate.

8. The backlight module according to claim 1, wherein an included angle between a fixing portion and the main body portion ranges from 60° to 100°.

9. The backlight module according to claim 1, wherein a joint between the main body portion and the at least one fixing portion has alternately arranged hollowed-out areas and connection areas, and the at least one fixing portion is formed by bending from the joint towards a side of the at least one fixing surface of the light guide plate.

10. The backlight module according to claim 1, wherein the optical film comprises at least two stacked optical film layers, the respective optical film layers have the same structure, and the respective optical film layers constitute the optical film comprising the main body portion and the at least one fixing portion.

11. The backlight module according to claim 1, wherein the backlight module further comprises a printed circuit board located between the second heat dissipation portion and the edge-lit light source.

12. The backlight module according to claim 1, wherein a light exit surface of the edge-lit light source is parallel to the light incident surface of the light guide plate, and the edge-lit light source is an LED light bar.

13. A display device, comprising: a backlight module and a liquid crystal display panel located on a light exit surface of the backlight module, wherein the backlight module comprises:

a light guide plate, comprising a light incident surface and a light exit surface adjacent to each other, and at least one fixing surface adjacent to the light exit surface;

an edge-lit light source, located on a side of the light incident surface of the light guide plate; and an optical film, comprising a main body portion and at least one fixing portion connected to the main body portion, wherein the main body portion is fixed to the light exit surface of the light guide plate, and the at least one fixing portion is snap-fitted to the at least one fixing surface of the light guide plate;

wherein the optical film further comprises a fourth fixing portion connected to the main body portion; the fourth fixing portion is snap-fitted to a side, facing away from the light incident surface of the light guide plate, of the edge-lit light source;

wherein the backlight module further comprises: a first reflective layer located on a side of a bottom surface of the light guide plate, a back plate located on a side, facing away from the light guide plate, of the first reflective layer, and a heat dissipation structure;

the back plate comprises a bottom plate and a side plate connected to each other, wherein the bottom plate is located on the side, facing away from the light guide plate, of the first reflective layer, and the side plate covers an outer side of a side edge of the light guide plate;

the heat dissipation structure comprises a first heat dissipation portion and a second heat dissipation portion connected to each other, wherein the first heat dissipation portion and the second heat dissipation portion form an "L" shape, the first heat dissipation portion is located between the first reflective layer and the bottom plate, and the second heat dissipation portion is located between the edge-lit light source and the side plate; and the fourth fixing portion is snap-fitted between the second heat dissipation portion and the side plate, or the fourth fixing portion is snap-fitted to a side, facing away from the second heat dissipation portion, of the side plate.

14. The display device according to claim 13, further comprising a supporting frame arranged around the liquid crystal display panel and configured to fix the liquid crystal display panel and the backlight module, wherein the liquid crystal display panel and the backlight module are embedded in the supporting frame.

15. The display device according to claim 13, wherein the light guide plate further comprises a bottom surface disposed opposite to the light exit surface, and the backlight module further comprises a first reflective layer located on a side of the bottom surface of the light guide plate;

the at least one fixing portion comprises a first extension portion, wherein the first extension portion extends to the side of the bottom surface of the light guide plate along an end portion of a side, facing away from the main body portion, of the at least one fixing portion, and the first extension portion is snap-fitted to a side, facing away from the light guide plate, of the first reflective layer.

16. The display device according to claim 15, wherein the at least one fixing portion each is provided with the first extension portion.

17. The display device according to claim 13, wherein a fixing surface comprises a first fixing surface arranged opposite to the light incident surface; and a fixing portion comprises a first fixing portion, and the first fixing portion is snap-fitted to the first fixing surface.

18. The display device according to claim 13, wherein a fixing surface comprises a second fixing surface and a third fixing surface adjacent to the light incident surface; and a fixing portion comprises a second fixing portion and a third fixing portion, the second fixing portion is snap-fitted to the second fixing surface, and the third fixing portion is snap-fitted to the third fixing surface.

* * * * *